April 1, 1941.   J. H. GRAHAM ET AL   2,236,848
CAN BODY WELDING MACHINE
Filed April 2, 1938   13 Sheets-Sheet 7

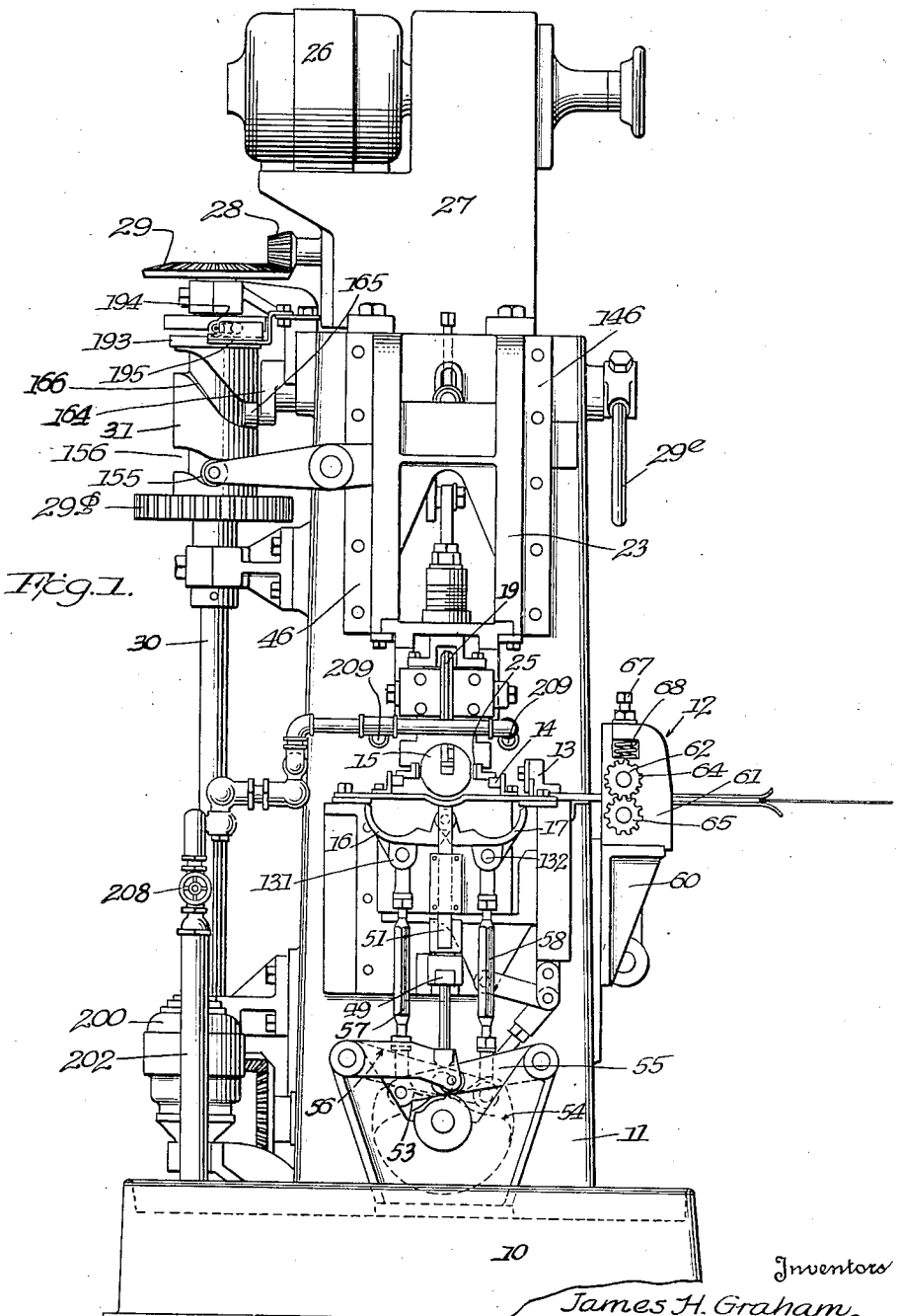

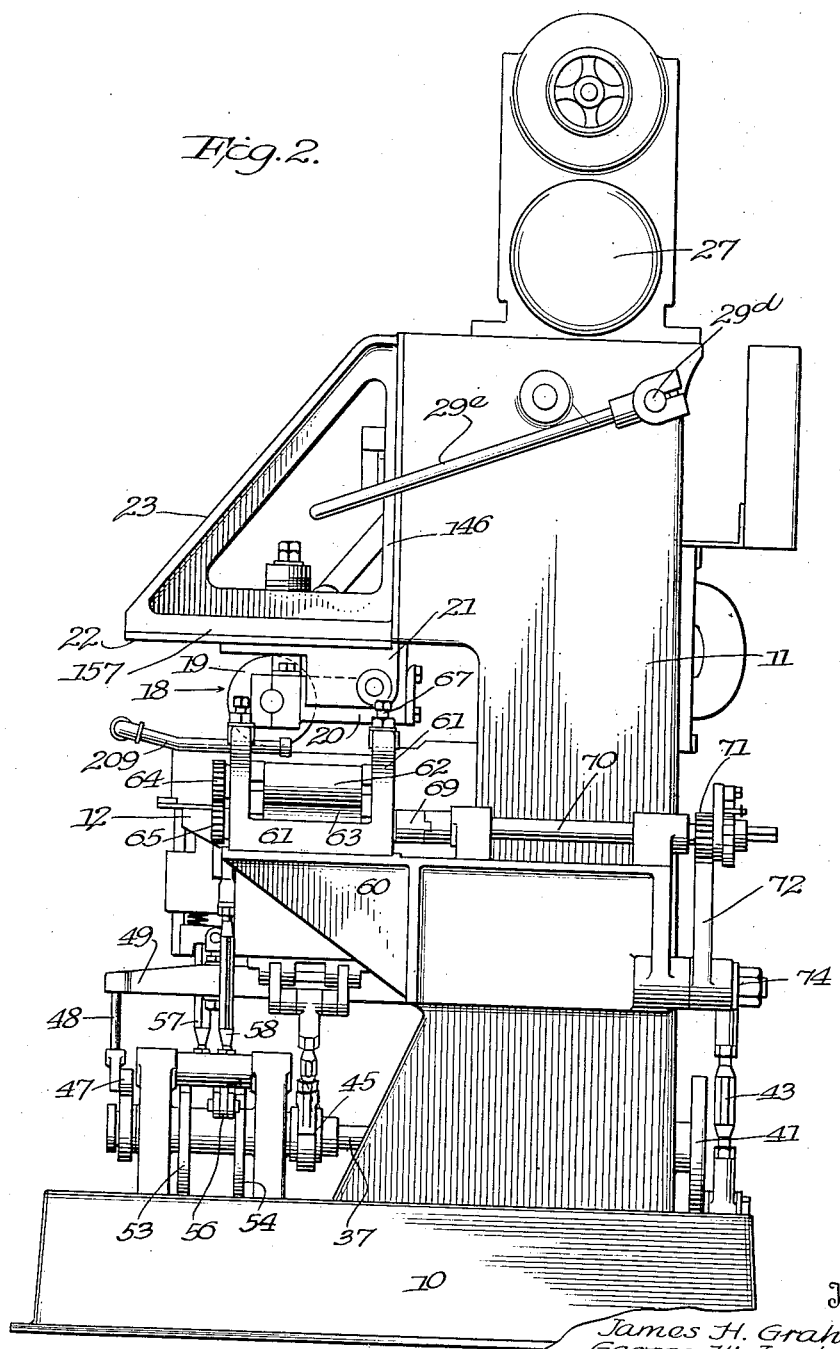

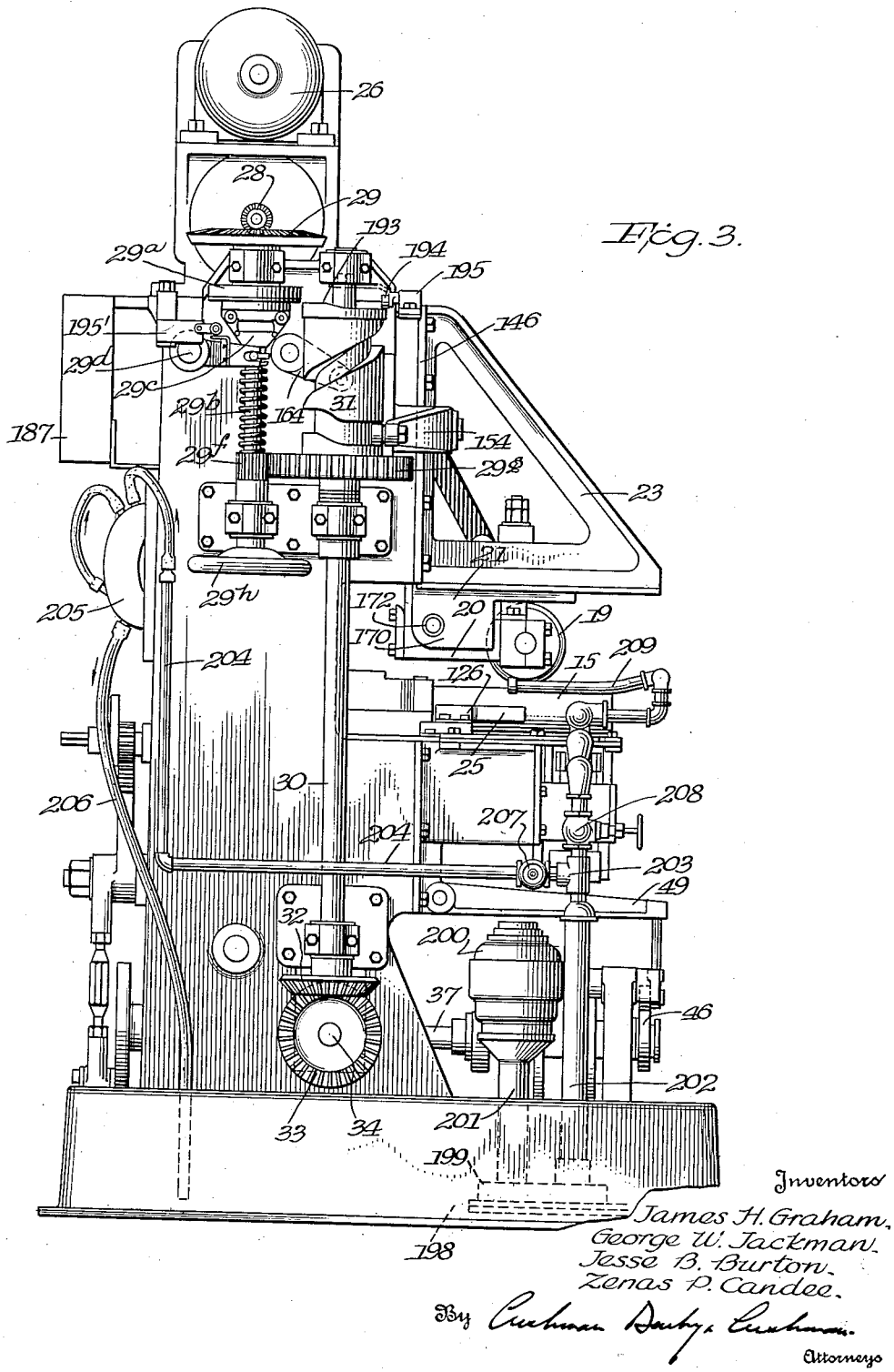

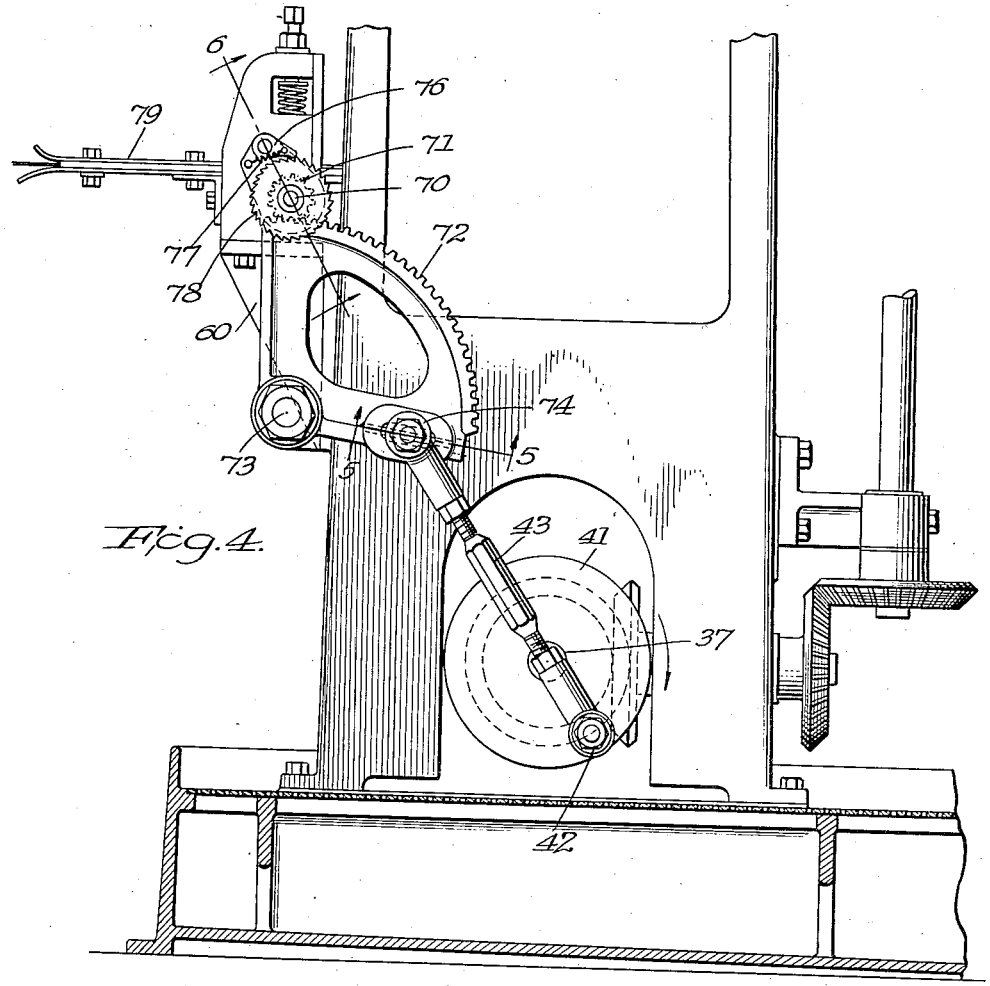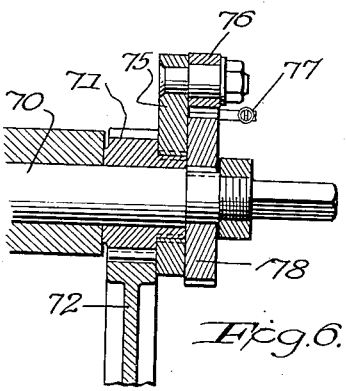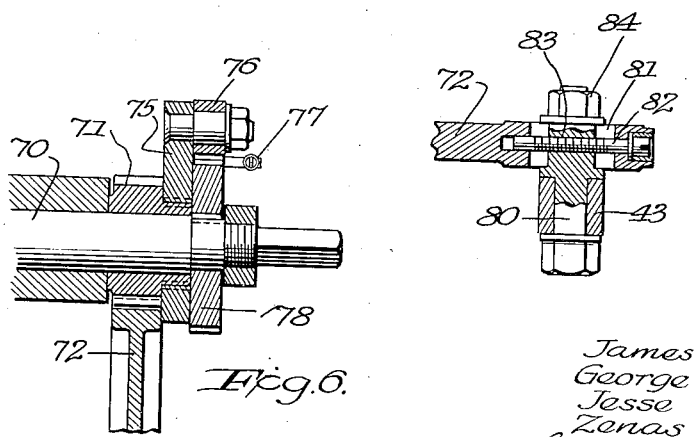

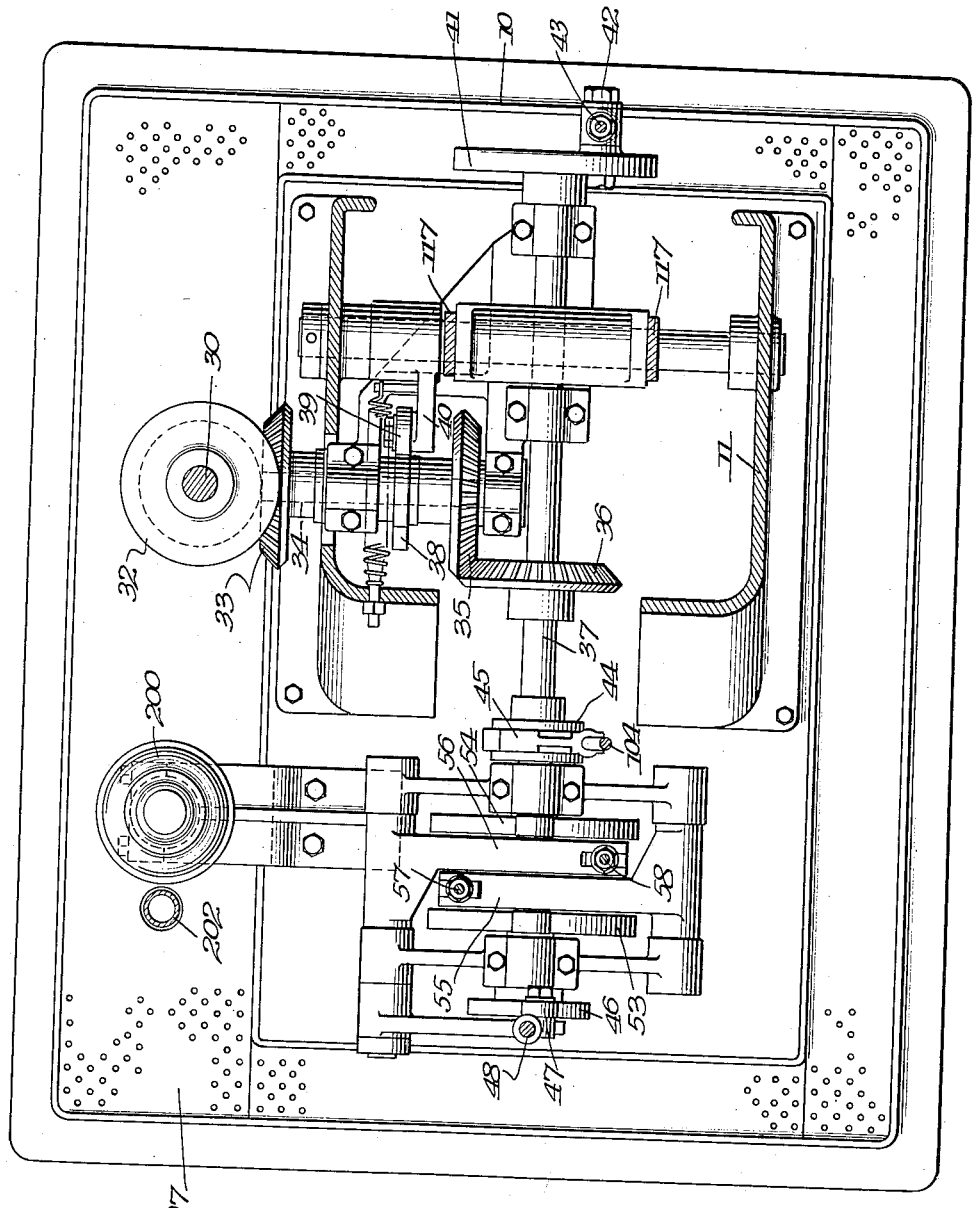

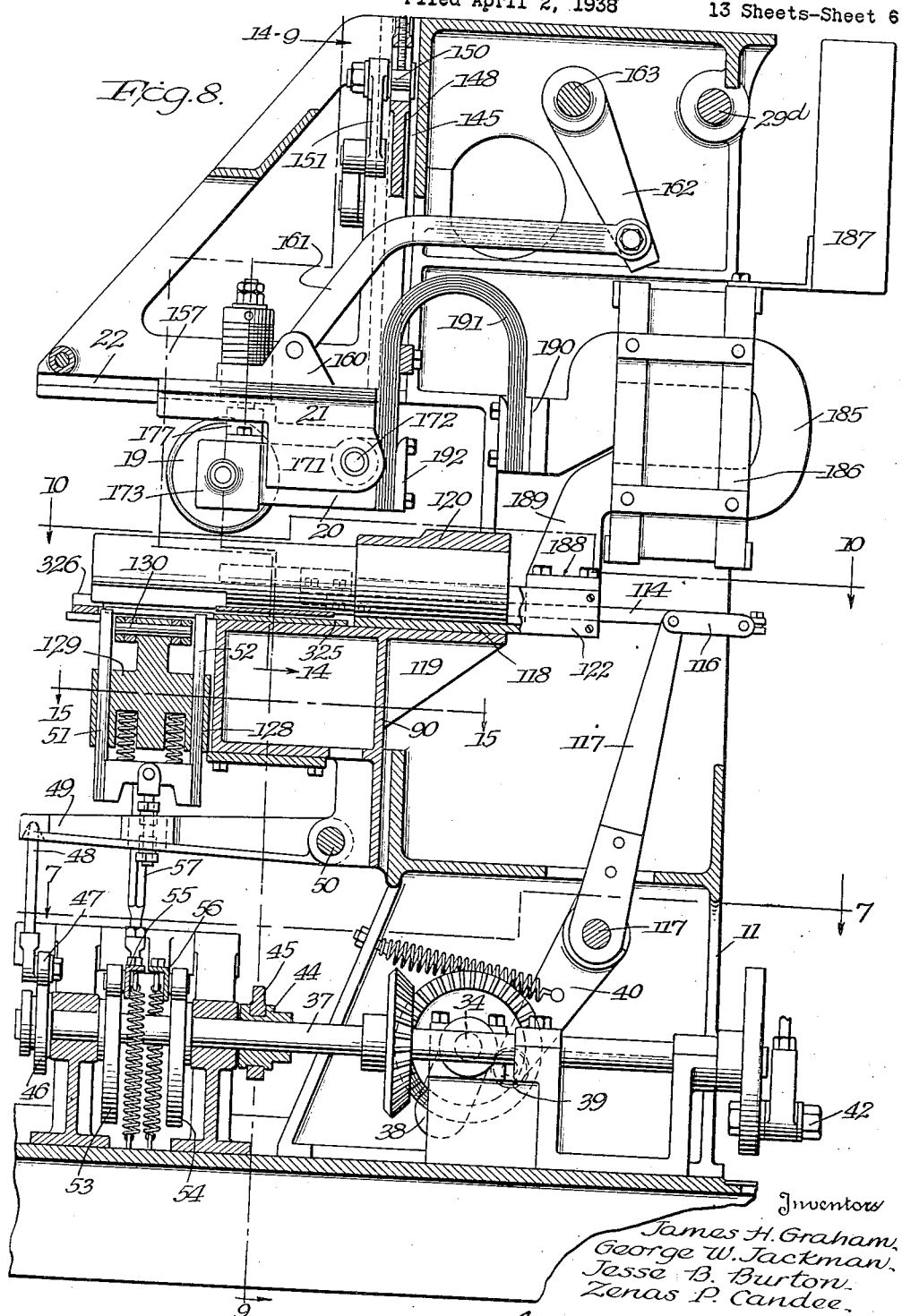

Inventors
James H. Graham.
George W. Jackman.
Jesse B. Burton.
Zenas P. Candee.
By Cushman Darby Cushman
Attorneys

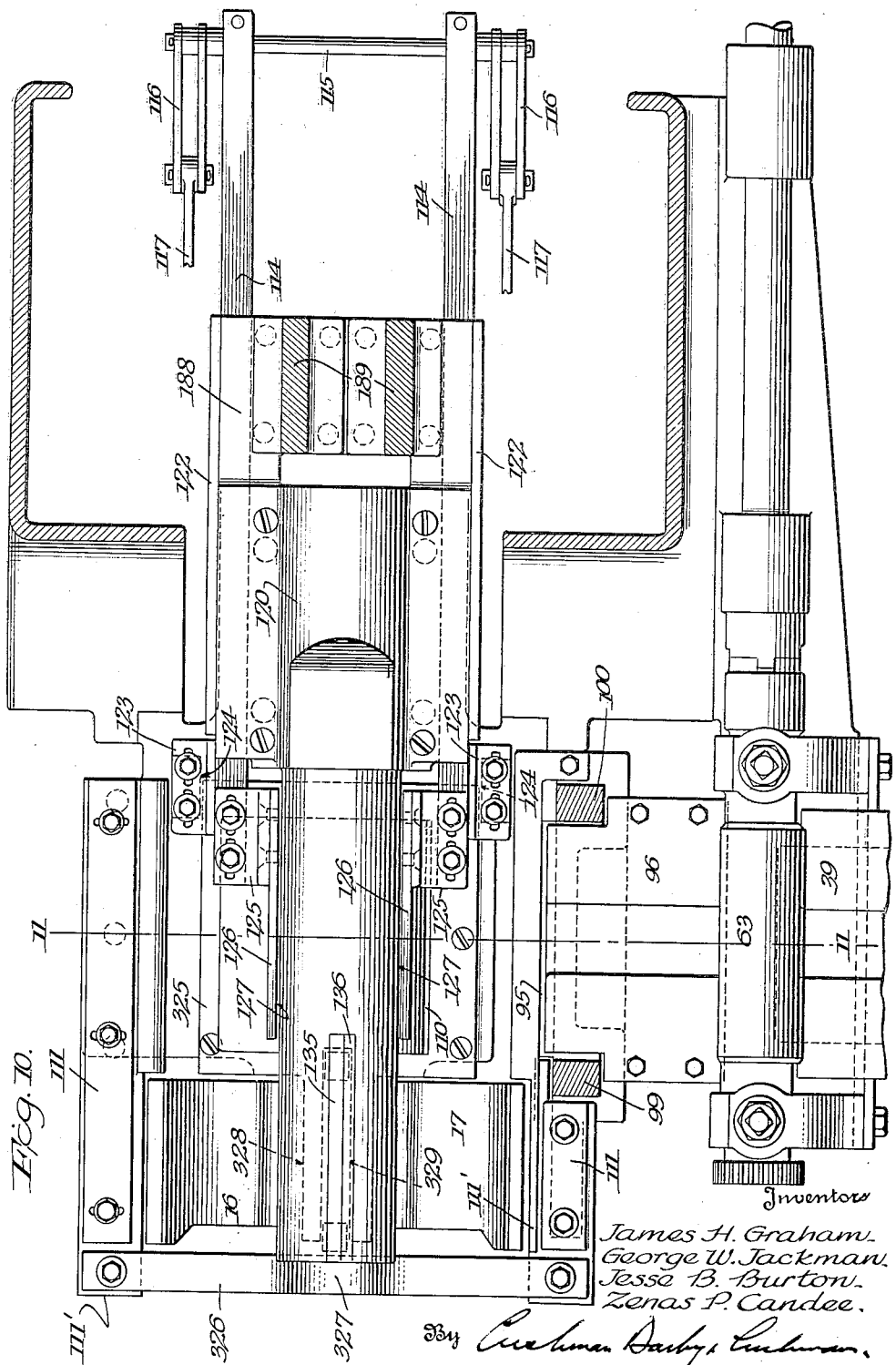

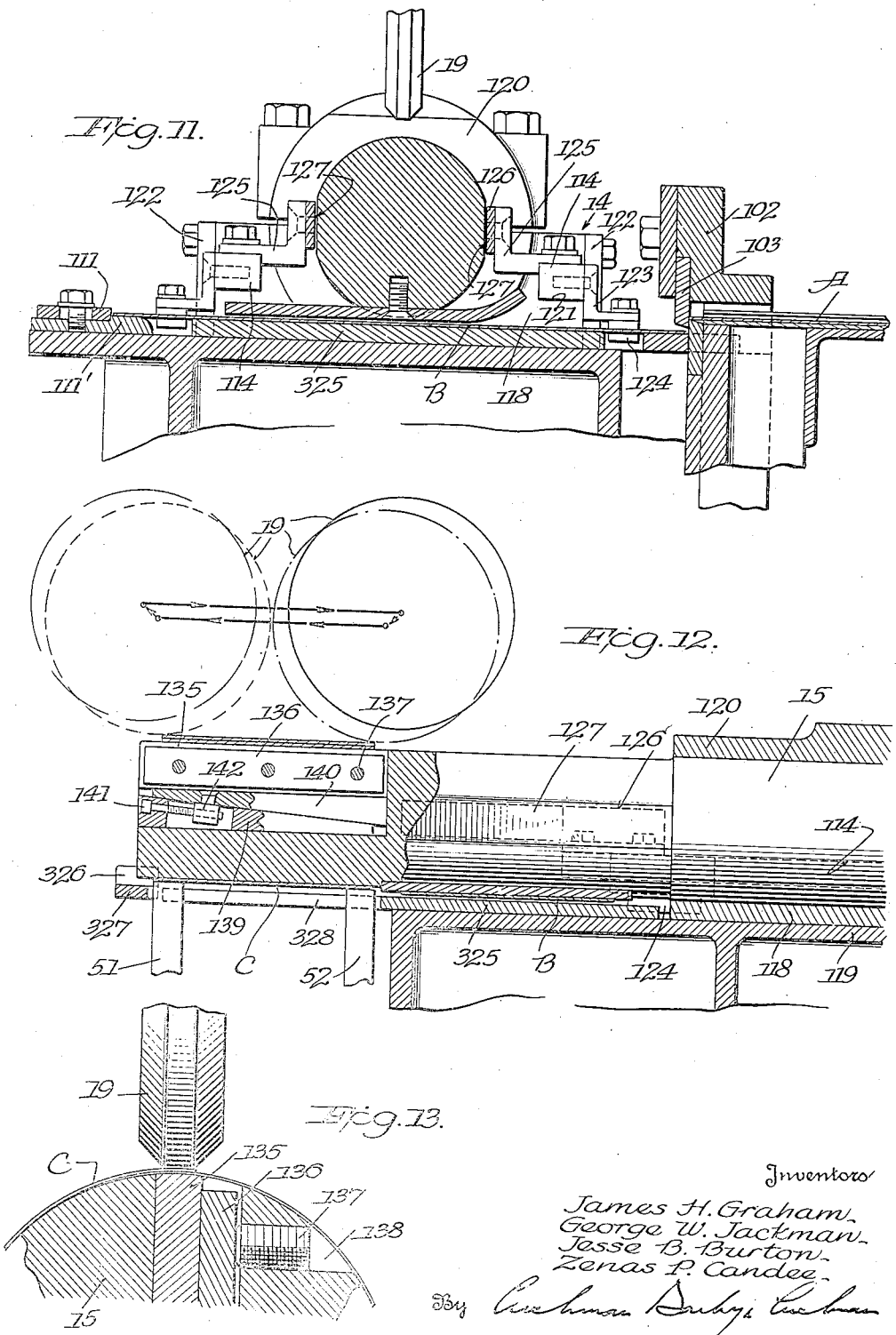

April 1, 1941. J. H. GRAHAM ET AL 2,236,848
CAN BODY WELDING MACHINE
Filed April 2, 1938 13 Sheets-Sheet 11

Inventors
James H. Graham
George W. Jackman
Jesse B. Burton
Zenas P. Candee
By
Attorneys

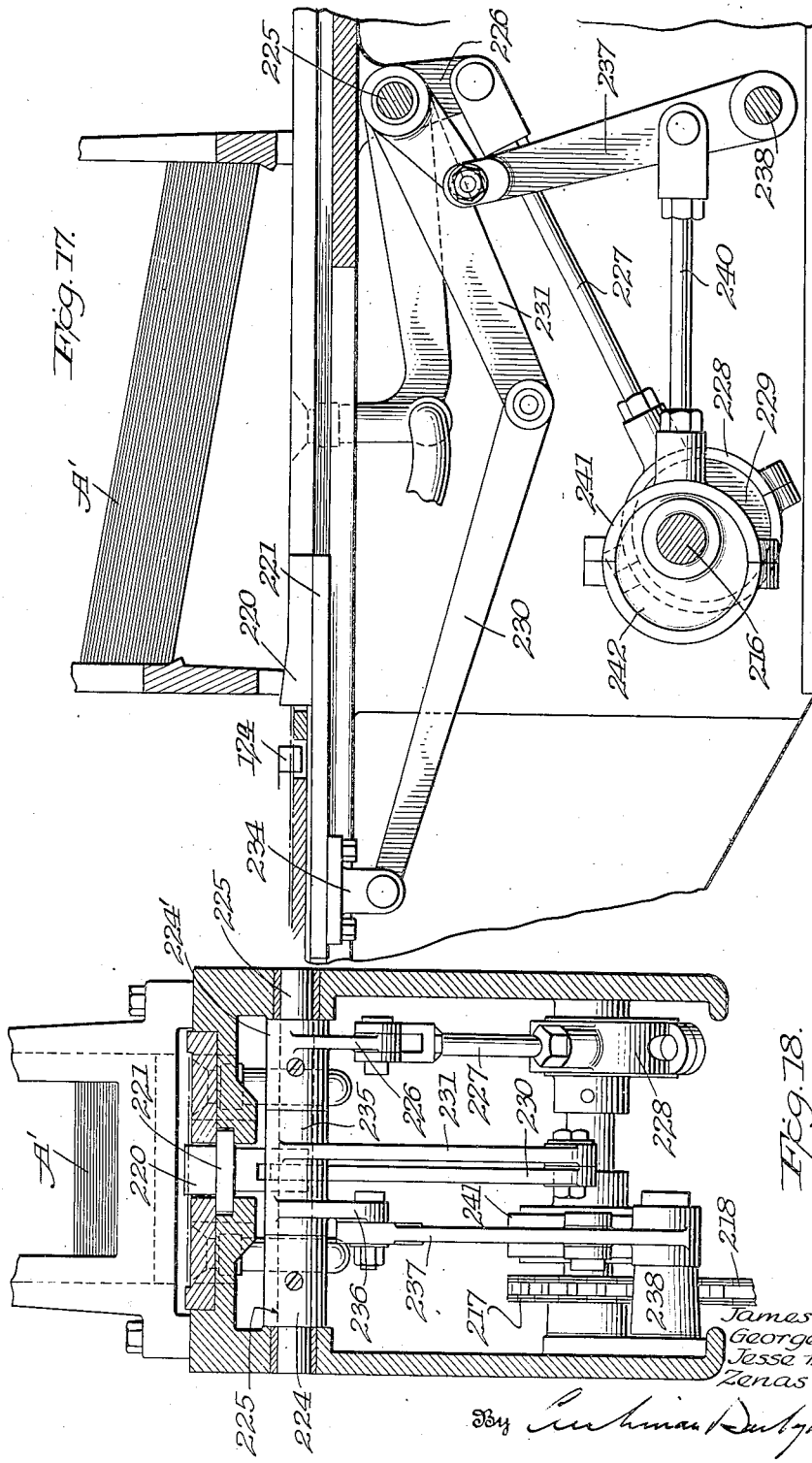

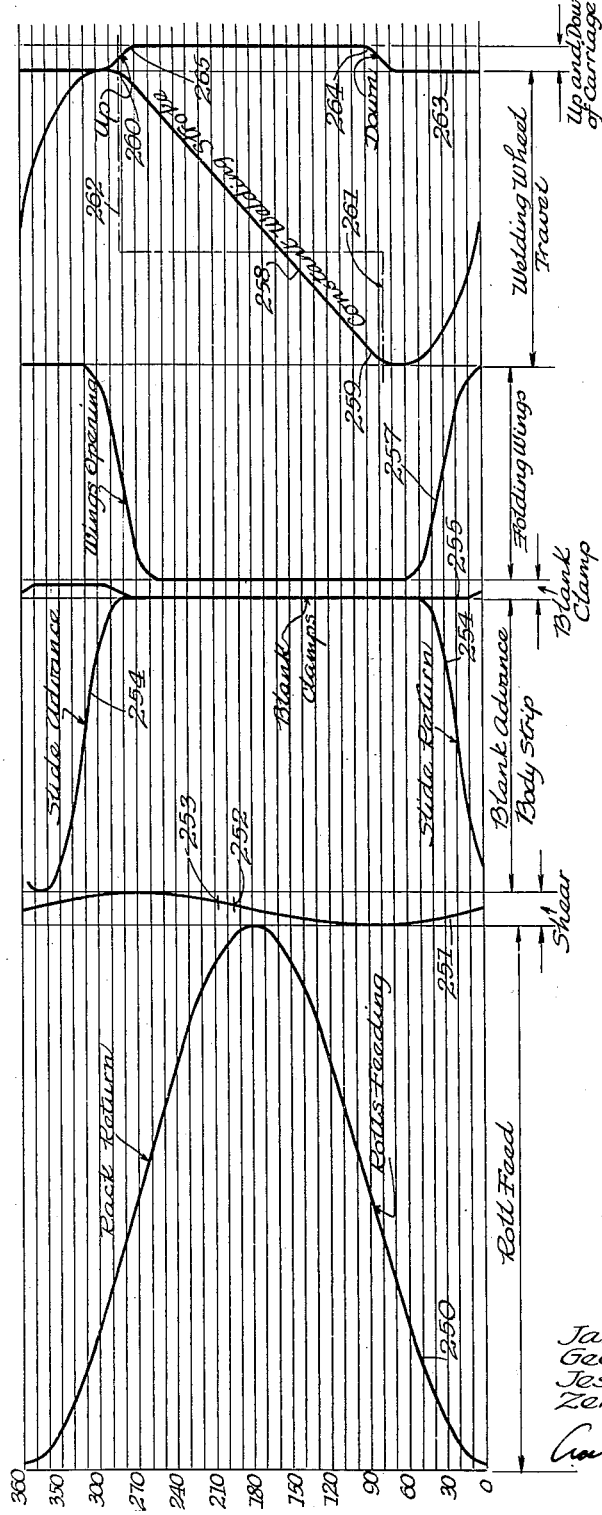

Patented Apr. 1, 1941

2,236,848

UNITED STATES PATENT OFFICE 2,236,848

CAN BODY WELDING MACHINE

James H. Graham, Torrington, and George W. Jackman, Jesse B. Burton, and Zenas P. Candee, Waterbury, Conn., assignors, by mesne assignments, to Crown Cork & Seal Company, Inc., Baltimore, Md., a corporation of New York Application April 2, 1938, Serial No. 199,728

15 Claims. (Cl. 219—6)

The present invention relates to a can body-making machine. More particularly, it relates to a machine for handling can body blanks, for shaping the blanks into cylindrical can bodies, and for electrically welding the side seams of the bodies after they are shaped.

It is an object of the present invention to provide a machine in which the several operations are performed automatically, and in sequence, and wherein certain of the successive steps are performed simultaneously on a plurality of blanks, thereby increasing the rate of production of the machine.

It is a primary object of the invention to provide improved electric welding means for the side seams of can bodies.

Further, the invention includes improved means for forming flat can body blanks into cylindrical shape, means for securely holding the bodies in position during the welding operation, and means for ejecting the welded bodies from the machine after welding.

The invention also contemplates novel means for feeding strip material into the machine, means for cutting flat blanks from the strip, and means for conveying the blanks to the position in the machine where they are formed into can bodies and welded along their side seams.

It is a further object of the invention to provide a machine where the blank feeding, forming, welding and ejecting means are all so coordinated and so operated by inter-related elements, as to produce a novel sequence of operations, resulting in an improved high speed machine.

It is a further object to provide novel means for controlling the initiation and termination of the application of welding current to the welding electrodes of the machine in predetermined, adjustable timed relation to the other, related operations of the machine.

The invention includes many other novel features of construction and many new combinations of parts, as shown illustratively in the accompanying drawings and described below.

Other objects and advantages of the invention will, therefore, become apparent to one skilled in the art from a consideration of the following description of a specific embodiment of the invention, shown in the drawings, in which:

Figure 1 is a front elevation of the machine.

Figure 2 is a side elevation taken from the right of Figure 1.

Figure 3 is a side elevation taken from the left of Figure 1.

Figure 4 is a partial rear elevation.

Figure 5 is a sectional detail taken on line 5—5 of Figure 4.

Figure 6 is a sectional detail taken on line 6—6 of Figure 4.

Figure 7 is a horizontal section, partly in plan, taken above the base of the machine and showing the driving mechanism.

Figure 8 is a central, vertical, longitudinal sectional view.

Figure 10 is a horizontal sectional view taken on line 10—10 of Figure 8.

Figure 11 is an enlarged, partial, transverse section taken on line 11—11 of Figure 8, with the electrode wheel in a different position.

Figure 12 is a diagrammatic detail taken on a central, vertical, longitudinal line, partly in section and partly in elevation.

Figure 13 is a detail of the mandrel and the electrode wheel.

Figure 17 is a similar view with the parts at their other limit of movement.

Figure 18 is a section on line 18—18 of Figure 17, and

Figure 19 is a timing diagram, showing the relationship of the various parts of the machine in the time cycle.

General description

Figure 9:
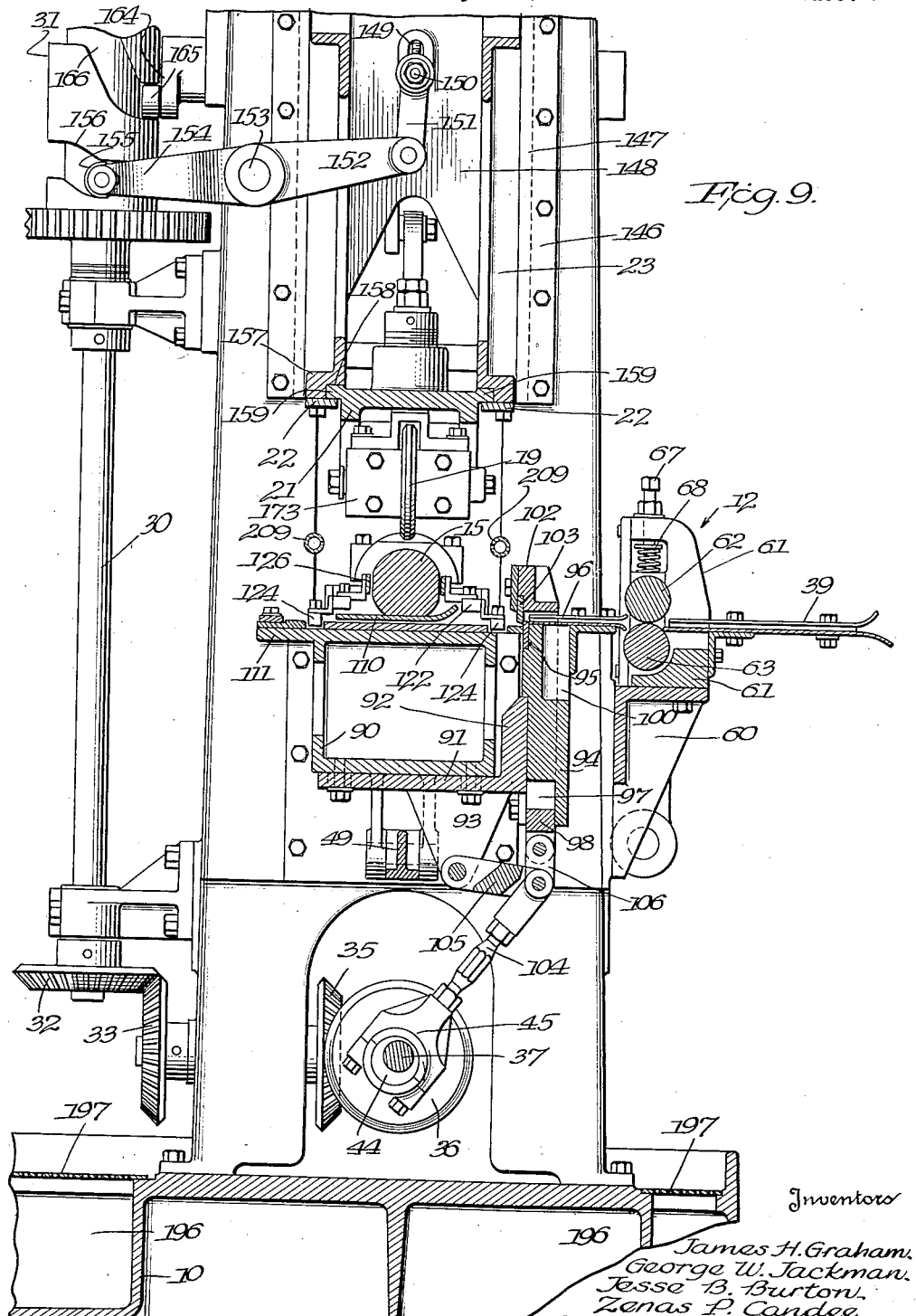
Figure 9 is a transverse, vertical sectional view taken on line 9—9 of Figure 8.

Referring to Figures 1, 2 and 3, a base 10, of special construction, as hereinafter pointed out, supports an upwardly projecting main frame structure 11. The several instrumentalities associated with the machine are carried either by the base 10 or by the main frame 11. A strip feed mechanism 12 intermittently feeds sheet material laterally into the machine from a roll or other source of supply, under a shearing mechanism represented generally at 13. The shearing mechanism severs can body blanks from the strip, and the latter are fed longitudinally of the machine to a body forming position by a reciprocating feed slide 14, described in detail below. After their advance to the forming position, the blanks are wrapped around a mandrel or horn 15 by wings 16, 17. While held by the wings in fixed position around the mandrel, with their edges overlapped, the blanks are welded by an electric welding means represented generally at 18. The welding means, as explained below, comprises the mandrel 15 and an electrode wheel 19 mounted on the free end of a lever 20 pivoted to a carriage 21 slidably mounted on track 22 associated with the lower, horizontal leg of a triangular bracket 23. The bracket 23 is mounted for vertical reciprocating movement in guideways formed in the main frame 11, above the mandrel 15, whereby the wheel electrode may be lowered and raised to be moved into and out of contact with the work on the mandrel, in predetermined timed relation to the horizontal reciprocations of the supporting carriage 21.

Associated with the blank advancing means 14, are a pair of strippers 25 which are reciprocated by the slide 14 to strip the welded can bodies from the mandrel, in advance of and simultaneous with the feed of a new blank to the forming position.

From this general description, it will be understood that the machine comprises means for feeding blanks laterally into the machine, means for advancing the blanks longitudinally of the mandrel into a forming position, means for wrapping the blanks around the mandrel into the form of can bodies, means for welding the side seams of the bodies, and means for stripping the welded can bodies from the mandrel, all of said means being designed and driven to operate in cooperative relation to each other, in a particular sequence.

Main drive

The driving means for the various instrumentalities of the machine will now be described, reference being had particularly to Figures 1, 3, 4, 7 and 8. An electric motor 26 or any other suitable source of power may be mounted above the machine. Preferably, it is connected through a variable speed change device 27 with a driving pinion 28. The latter (Fig. 3) is in mesh with an enlarged bevel gear 29 fixed to the upper end of a stub shaft, carrying a clutch disc 29a which drives a short vertical shaft 29b through clutch 29c. The clutch may be disengaged by oscillating the rock shaft 29d having an operating handle 29e on the other side of the machine (Figs. 1 and 2). A spur gear 29f on the shaft 29b is in mesh with a similar gear 29g on a vertical shaft 30. Also, a hand wheel 29h is fixed on the short vertical shaft 29b, so that the machine can be turned over by hand.

The shaft 30 carries a cam barrel 31 at its upper end, which, through the mechanism hereinafter described, imparts vertical movements to the bracket 23 and horizontal movements to the carriage 21. At its lower end (Fig. 3), the shaft 30 carries a bevel gear 32 in mesh with a similar gear 33 fixed to a transverse stub shaft 34. As shown in Figure 7, the stub shaft 34 is provided at its inner end with a bevel gear 35 in mesh with a similar gear 36 fixed to a main, longitudinally disposed, horizontal cam shaft 37. The stub shaft 34 has fixed thereon a cam 38 which engages a follower 39 on the lower end of a lever 40, forming a part of the blank advancing means, as shown in Figure 8, and as will be explained hereinafter.

The main cam shaft 37 is provided with a plurality of cams, cranks and eccentrics, to serve as a driving means for the strip infeed rolls, the blank shearing means, the means for clamping the blanks beneath the mandrel, and the means for wrapping the blanks around the mandrel to form can bodies. Referring to Figure 7, and at the rear end of the shaft 37, and on the outside of the main frame 11, there is a crank disc 41 having a pin 42 connected to a crank rod 43 which, in turn, is connected to the strip infeed drive, described below.

At a point intermediate its ends, the shaft 37 carries an eccentric 44 and strap 45. As shown in Figure 9, the strap 45 actuates the vertically reciprocable slide which carries the movable shear blade.

Adjacent its forward end, the shaft 37 carries three cams, one for the blank clamping rods and another for each of the blank wrapping wings. As indicated in Figures 7 and 8, the cam 46 at the front of the shaft actuates a roller 47 connected through a link 48 to a longitudinally arranged lever 49 pivoted to the frame at 50 and adapted to actuate the can body blank clamping rods 51, 52, as explained below. The other forwardly disposed cams 53, 54 actuate the crossed levers 55, 56 which are respectively connected to vertically movable operating rods 57, 58, connected to the blank wrapping wings.

With this understanding of the general construction of the machine and of the driving mechanism for the several parts thereof in mind, a preferred form of strip feed will now be described.

Strip material infeed

Referring to Figures 1, 2 and 9, the feeding means represented generally at 12 includes a bracket 60 mounted on the side of the main frame 11. A U-shaped roll supporting frame 61 is supported thereon, having feed rolls 62, 63 journalled therein. The rolls are preferably interconnected by pinions 64, 65 fixed to their spindles, to rotate in unison. Screws 67 mounted in the frame 61 apply adjustable resilient pressure to the rolls through coil springs 68 or the like. The spindle of the lower roll 63 is connected (Fig. 2) through a coupling 69, to a rearwardly extending drive shaft 70 having a pinion 71 loosely mounted thereon. The pinion 71 (Fig. 4) is in mesh with an arcuate rack 72 pivoted at 73 to the bracket 60 and having an adjustable connection 74 with the crank rod 43. As shown in Figures 4 and 6, the pinion 71, loose on the shaft 70, carries a plate 75 splined thereon. The plate has an extension upon which a pawl 76 is pivoted, the latter being urged inwardly by a tension spring 77. A ratchet wheel 78 is keyed or splined to the shaft 70 for rotation therewith.

It will be apparent from a consideration of the structure just described and shown in Figures 4 and 6, that, upon the clockwise movement of the rack 72, the pinion 71, the plate 75 and the pawl 76 will be rotated in a clockwise direction and that the pawl 76 will engage the teeth on the ratchet 78 to rotate the latter and the shaft 70 in a clockwise direction. This rotation of the shaft will drive the lower feed roll and, through the pinions 65, 64, the upper feed roll. Such rotation will feed a strip of sheet material through the guide plates 79 into the machine.

Upon a reverse oscillation of the arcuate rack 72, the pinion 71, the plate 75 and the pawl 76 will rotate in the opposite direction, and the pawl 76 will ride over the teeth of the ratchet, whereby rotation will not be imparted thereto, nor to the shaft 70 and the feed rolls in the opposite direction.

The throw of the arcuate rack 72, and consequently the number and degree of rotations imparted to the feed rolls, may be adjusted by changing the point of connection, radially of the rack, between the rack and the crank rod 43. Such connection is shown at 74 in Figure 4 and in somewhat more detail in Figure 5. The crank rod 43 carries a laterally projecting bolt 80 which has its end disposed in a radial slot 81 in the lower leg of the arcuate rack. A pin 82 extends lengthwise of the slot and is threaded in a transverse bore 83 in the bolt 80, whereby its position may be accurately adjusted. A nut 84 clamps the bolt 80 in the adjusted position.

It will thus be seen that the continuous rotation of the shaft 37 will, through the mechanism just described, impart intermittent rotations to the feed rolls, to feed a predetermined length of strip material intermittently into the machine. The rolls, obviously, will stop after a predetermined feed and will remain idle for a definite period of time, during which certain other operations of the machine are being performed.

The first such operation is the shearing of a can body blank from the sheet material so fed into the machine.

Shears for cutting blanks from strip

Figure 15:
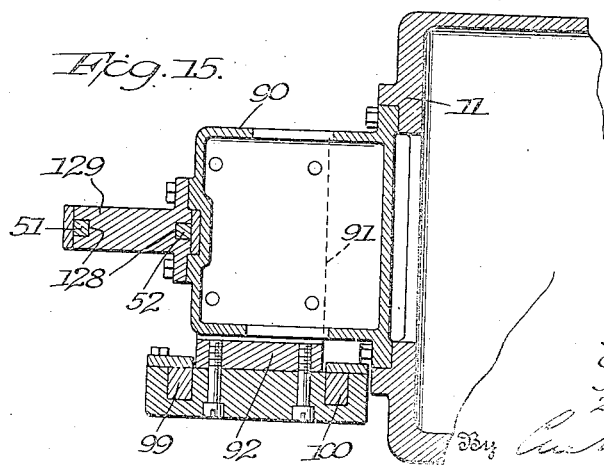
Figure 15 is a fragmentary, horizontal section taken on line 15—15 of Figure 8.

Referring to Figures 9 and 15, a substantially box-like bracket 90 is secured to the front face of the main frame 11. The bracket serves as a support for the shear assembly and for the can body clamping and wrapping means hereinafter described. The bracket 90 (Fig. 9) carries a special angle casting 91 having a vertical portion 92 projecting upwardly along one side of the bracket 90. A depending flange 93 projects down below the horizontal portion of the angle casting 91. The vertical portion 92 carries a block 94 having at its upper end, a stationary shear blade 95, underlying the strip material fed into the machine through the guide plates 96. The block has a lower horizontal recess 97 (Fig. 9) in which the horizontal bar 98 of the shear actuating yoke moves vertically. The yoke comprises, in addition to the horizontal bar 98, a pair of vertical arms 99, 100, which are shown in Figures 10 and 15. These members are connected at their upper ends to the horizontal shear frame 102, which carries the movable shear blade 103. The lower portion 98 of the shear actuating yoke is connected, through an adjustable rod 104, to the cam follower 45. A link 105 pivoted to the downwardly projecting flange 93 assists in the transmission of shearing force from the connecting rod 104 to the shear actuating yoke, through a short intermediate link 106.

From a consideration of this structure, it will be seen that intermittent vertical reciprocations will be imparted to the shear blade 103 by the main shaft 37, in predetermined timed relation to the movements of the roll infeed. Thus, the rolls 62, 63 will feed a strip of material inwardly past the open shears, under the guide plate 110, against the longitudinal guide strip or abutment 111. When the strip has been fed to that position, the rotation of the rolls will stop, and the shear will operate to cut off a blank, whereupon the blank advancing means now to be described will operate to advance the sheared blank to a position to be operated upon by the body forming wings and the like.

Blank advancing and can stripping means

Referring to Figures 8, 10, 11 and 14, the blank advancing means 14 comprises a pair of horizontally disposed, longitudinally extending slide rods 114, connected by a tierod 115 at their rear ends and mounted for sliding movement in the mandrel supporting bracket. At their rear ends, the slides 114 are connected by links 116 to parallel arms 117, fixed to a rock shaft 117, which carries the lever arm 40 having the cam roller 39 on its lower end, in engagement with the cam 38 on the stub shaft 34. By this mechanism, reciprocating movement is imparted to the slides 114.

The rods 114 are slidably mounted in the mandrel supporting bracket (Figs. 8 and 10) which comprises a lower half section 118 bolted to a rearwardly extending flange 119 integral with the bracket 90. An upper half section 120 is bolted to the lower section, as shown in Figure 11, to embrace the rear end of the mandrel 15. The lower section of the bracket is provided with horizontal, parallel ways 121 cut in its opposite outer faces and the slides 114 are mounted therein for reciprocating movement. The ways are closed by face plates 122 bolted to the vertical sides of the lower section 118.

The slides 114 at their forward ends carry angle irons 123 projecting downwardly and outwardly. Abutment members 124 are carried by the angle pieces 123 in position to lie behind the rear ends of blanks B sheared from the strip A. These abutments serve to advance the blanks along the bed plate 325 from the infeed and shearing position to the working position adjacent the forward end of the machine, where the blanks are formed into can bodies C. Figure 12 shows the relative positions of infeed and body forming. At the forming position, the longitudinal movement of the blanks is arrested by a transverse stop bar 326, having a central, arcuate, depressed portion 327. The bed plate 325 terminates at its forward end in longitudinally projecting fingers 328, 329, which straddle the gripper rods 51, 52 and support the blanks prior to engagement by the grippers and folding wings 16, 17.

The slides 114 also carry upwardly and inwardly projecting angle pieces 125 which support forwardly projecting pusher fingers 126. The latter are disposed to slide along diametrically disposed, flat portions 127 on the mandrel 15. The pusher fingers 126 move with the slide 114 and abut the rear ends of can bodies C after the latter have been formed and welded, to strip the bodies from the mandrel while the abutments 124 simultaneously advance a new blank B to the forming and welding position. These operations are actuated by the drive shaft 34, to operate in synchronism with the other instrumentalities in the machine.

Can body forming wings

The flat blanks, fed by the abutments 124 to the working position, are formed into cylindrical bodies by the wrapping wings 16, 17. The flat blanks are supported initially at the working position along their edges by continuations of the longitudinal guide strips 111 and the plates 111' upon which they are mounted. The blanks are supported centrally by the forwardly projecting fingers 328, 329. Also, they are clamped against the bottom of the mandrel by clamping rods 51, 52, previously mentioned. These rods (Figs. 8 and 15) are slidably mounted in ways 128 in a block 129 bolted to the bracket 90. A horizontal pivot pin 130 is carried by an upwardly extending portion of the block 129. The wings 16, 17 are pivotally mounted on the pin 130 and are also connected at 131, 132 to the upper ends of the rods 57, 58, respectively. Preferably, these rods are adjustable in length by a conventional turnbuckle arrangement.

Figure 14:
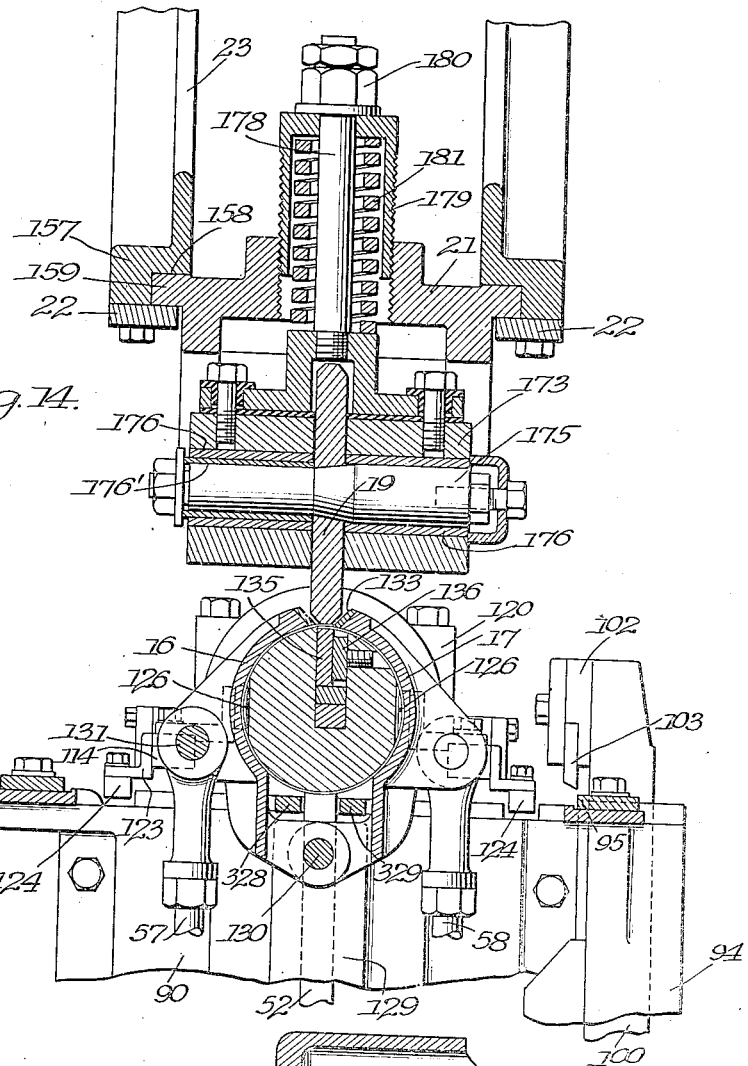
Figure 14 is an enlarged partial, vertical, transverse section taken on line 14—14 of Figure 8.

The wings are operated by the levers 55, 56, respectively, and the actuating cams are so timed that one of the wings, for instance the wing 17, operates slightly in advance of the other, so that one edge of the blank overlaps the other, as shown in Figures 13 and 14.

The upper ends of the wings, when in closed position, are spaced apart and tapered outwardly, as shown at 133 in Figure 14, thus leaving a narrow, elongated, exposed area at the side seam to accommodate the welding wheel.

Welding mechanism

As pointed out above, the mandrel 15 is supported by the two-piece bracket 118, 120. The mandrel serves as one of the welding electrodes and is preferably provided with an adjustably mounted electrode strip 135, the details of which are shown in Figures 12 to 14. The strip is mounted in a vertical slot in the mandrel with a juxtaposed pressure plate 136. Threaded plugs 137 are disposed in lateral bores 138 to apply pressure to the plate 136 and the electrode strip 135, to hold the latter in adjusted position. The adjustment may be determined by a pair of wedges 139, 140, mounted in the bottom of the slot and relatively movable longitudinally by means of an adjusting screw 141 journalled in one wedge and threaded to a block 142 associated with the other. Obviously, by rotating the screw 141, the upper wedge 140 may be moved forwardly or rearwardly, to raise or lower the electrode strip to the desired position, whereupon the threaded plugs 137 may be tightened to clamp the strip in the adjusted position.

The welding wheel 19 and its operating mechanism will now be described.

As previously noted, the main frame of the machine supports a vertically movable, triangular bracket 23 which, in turn, supports the carriage 21 having the welding wheel 19 pivoted thereto by an arm 20. The front face of the main frame is provided with a vertical slideway 145 formed by plates 146 bolted thereto. The vertical leg 146 of the bracket 23 has laterally projecting flanges 147 which are mounted in the slideway for vertical movement. The rear face 148 of the bracket 23 is provided with a vertical slot 149 in which a bolt 150 is adjustably mounted. A link 151 is pivotally connected at one of its ends to the bolt 150 and at its other end to a rocking lever 152. The latter is pivoted at 153 to the main frame and its outer end 154 is bent rearwardly into close proximity with the cam barrel 31. A roller 155 on the end 154 of the lever arm rides in a cam groove 156, so that rocking motion in a vertical plane is imparted to the lever, arm and, through the link 151, the bracket 23 is reciprocated vertically in its guides.

The lower, horizontal leg 157 of the bracket 23 has a pair of undercut grooves 158 formed on its opposite inner sides (Fig. 9). The plates 22, which act as tracks for the carriage 21, are bolted below the undercut portions, to provide a slideway receiving the laterally projecting flanges 159 on the carriage 21. The carriage is provided with an upwardly projecting portion 160 (Fig. 8) having a pivotal connection to an elongated, bent link 161 which, in turn, is connected to an arm 162 fixed to a rock shaft 163. The latter projects outwardly through the side of the frame, where a crank arm 164 is fixed thereon, having a roller 165 on its end riding in a specially constructed cam groove 166 in the barrel 31. By these connections, the rock shaft 163 is oscillated, and reciprocating movements are imparted to the carriage 21 slidable along the lower leg of the bracket. The cam groove 166 is so laid out that its portion which serves to advance the carriage during the welding stroke is a constant velocity curve, whereby the carriage and wheel move at a predetermined, constant rate of speed during the welding operation. It will be apparent that the reciprocating movements of the carriage are in timed relation to the vertical movements of the triangular bracket 23, since both motions are derived from the same cam barrel. By these means, the horizontal and vertical movements of the welding wheel 19 are controlled.

As pointed out above, the carriage 21 is slidable along the lower, horizontal leg of the triangular bracket. The carriage includes downwardly projecting horizontal side flanges 170, 171. At their rear ends, the flanges carry the pivot pin 172 for the lever arm 20. The pin preferably is electrically insulated from the carriage 21, by a non-conducting bushing 172' or the like. The arm 120, at its forward end, terminates in a bearing block 173, as shown in Figure 14. The axle 175 for the electrode wheel 19 is journalled in sleeves 176, 176' clamped in the journal box.

A pressure bar 177 is bolted to the upper side of the lever arm 20, adjacent its outer end and is insulated therefrom, as shown in Figure 14. The bar carries a vertical guide pin or bolt 178 which extends through an externally threaded cap 179, carried by the carriage 21. A nut 180 on the upper end of the bolt 178 above the cap 179 limits the downward movement of the lever arm 22 and the electrode wheel 19 with respect to the carriage. A heavy compression spring 181 is disposed between the pressure bar 177 and the top of the cap 179, thereby constantly urging the arm 20 and electrode wheel downwardly. However, when the triangular bracket 23, the carriage 21 and the parts supported thereby are lowered, to bring the electrode wheel into contact with the work on the mandrel, the spring will be compressed and the carriage will move downwardly a slight distance with respect to the wheel, to apply pressure through the spring 181 to the wheel and the work. At the end of the stroke, and after the welding operation has been completed, the bracket 23 and carriage 22 will be raised, whereupon the nut 180 will contact the upper end of the cap 179 to raise the outer end of the lever arm and the electrode wheel upwardly with the bracket and carriage, to lift the wheel out of contact with the work.

Current control

Welding current for the mandrel and for the electrode wheel is provided by a transformer represented diagrammatically at 185 in Figure 8. The transformer is supported in a frame 186, which also serves as a support for a main control box 187 having conventional circuit controlling relays and the like therein. Current passes from one leg of the transformer to a rearwardly extended portion 188 of the lower half 118 of the mandrel supporting bracket. The terminal portion 189 of the transformer may be bolted directly to this rearward extension 188. The other terminal 190 of the transformer is connected, through a heavy, resilient conduit 191, to the rear end 192 of the lever arm 20, supporting the electrode wheel 19. The conduit 191 is preferably made up of a plurality of laminations of copper plates and is sufficiently flexible to permit the necessary reciprocations of the carriage 21 and the parts supported thereby.

Referring to Figures 1 and 3, the cam barrel 31 carries, at its upper end, a vertically projecting cam member 193 positioned to actuate a roller 194 associated with a limit switch 195 which controls the flow of welding current to the mandrel and the electrode wheel 19. The cam member is preferably removable and is adjustable circumferentially of the barrel 31, so that the time of commencement and termination of the welding current may be adjusted. Preferably, the limit switch 195 effects the current control through one or more relays which, for convenience, may be positioned in the control box 187. A second limit switch 195', in series with the switch 195, is controlled by the clutch 29c, so that, when the clutch is thrown out, the current to the welding electrodes is cut off.

Cooling means

Means are provided for cooling the electrode wheel and the mandrel, and also for cooling the transformer 185. Preferably, the mandrel and electrode wheel are cooled by a water spray and the transformer by a direct circulation of water through an appropriate water jacket. As shown in Figure 9, the base 10 of the machine is provided with a marginal channel 196 for the collection and storage of cooling fluid. The upper end of the channel is preferably closed by perforated cover plates 197. The cooling water drainage channel leads downwardly to a sump portion 198 (Fig. 3), wherein a rotary pump 199 is positioned. The pump may be of the centrifugal type or of the intermeshing gear type. The pump is driven by a motor 200 connected therewith by a cylindrical shaft housing 201. The pump discharge flows upwardly through a conduit 202 to a T-fitting 203. One branch leads through a conduit 204 to the water jacket 205 associated with the transformer, and, thence, through a discharge conduit 206 to the sump in the base of the machine. In line 204 there is a control valve 207 whereby the amount of water flowing to the transformer may be varied at will.

The other branch of the fitting 203 leads through a control valve 208 and thence through a plurality of elbows and unions to a pair of longitudinally extending spray nozzles 209 disposed in parallel relation to the mandrel 15. The unions and elbows are provided so that the spray devices may be swung forwardly away from juxtaposition to the mandrel and then laterally to a remote, inoperative position. The valve 209 controls the volume of spray. The cooling fluid, after being sprayed on the work and on the two electrodes, drains down to the base of the machine, through the perforated cover plates 197 and thence to the sump, where it is again circulated by the pump 199.

Modification, stack feed

Figure 16:
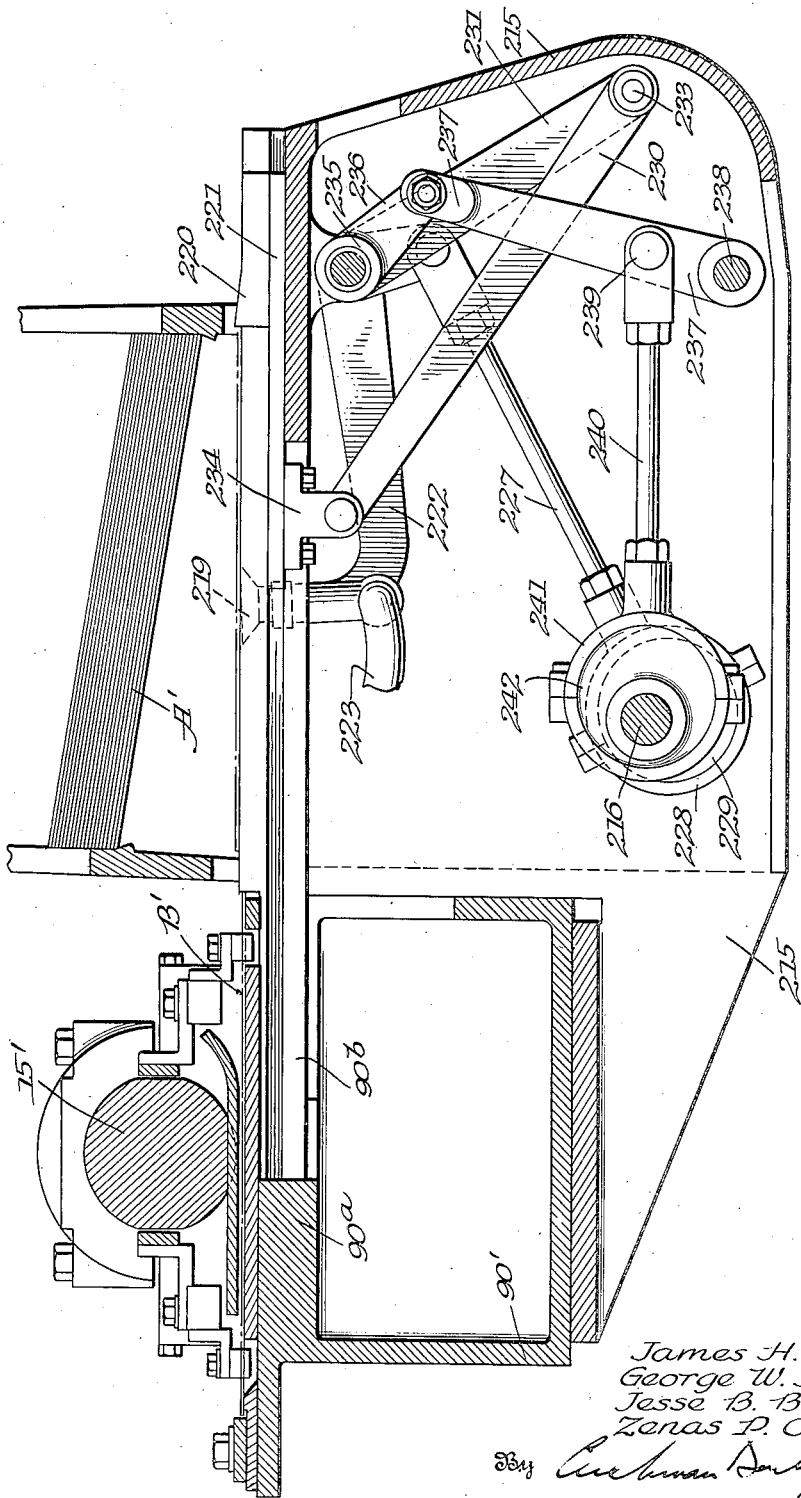
Figure 16 is a vertical, transverse section through a modification, showing a stack feed.

In Figures 16 to 18, a modified form of blank infeed is shown, which may be substituted for the strip feed and shearing means disclosed in the other figures and described above. This apparatus is a "stack feed", adapted to deliver flat, pre-cut blanks from a stack or pile, as distinguished from a strip of sheet material. In many can plants, blanks are purchased from the steel mill in pre-cut form, already stacked for use in the can-making machines and where it is the practice to use such blanks, the feeding mechanism shown in Figures 16 to 18 is preferred, whereas in other plants, where the stock is purchased in rolls of sheet material, the first form is preferred.

A comparison between Figure 16 and Figure 9 shows that the stack feed may be attached to the bracket 90 in place of the angle casting 91, the shear block 94 and the roll supporting frame 60. The bracket 90' shown in Figure 16 is slightly different, however, in that a portion of its upper surface 90a is cut away as at 90b, for purposes hereinafter described.

The feeding mechanism is mounted in a casing 215, bolted or otherwise secured to the bracket 90'. A shaft 216 is journalled in the casing and is provided with a sprocket or other driving means 217 which derives motion through a chain 218 or the like from the main cam shaft 37, previously described. A link and lever mechanism driven by a cam on the shaft 216 serves to oscillate a pair of suction cups 219 in a vertical plane to move blanks A' from the bottom of a stack downwardly to a position to be engaged by an abutment 220 associated with a slide 221. Similar links and levers are driven by another cam to reciprocate the slide 221 and to feed the blanks laterally into the position B', under the mandrel 15', where they are advanced by the longitudinal pushers of the machine to the forming position, as previously described.

The suction cups 219 are mounted on the upper ends of oscillating arms 222 and are in communication with an intermittent source of suction through conduit means 223. Each arm 222 projects outwardly from collars 224, 224' fixed by set screws upon a transverse shaft 225, journalled in the opposite sides of the casing 215, as is shown in Figure 18. The collar 224' also has an integral, downwardly projecting lever arm 226, pivotally attached at its lower end to a connecting rod 227. The latter is secured to a strap 228 associated with an eccentric cam 229 on the cam shaft 216. Thus, reciprocating movements imparted to the connecting rod 227 serve to oscillate the short arm 226, the sleeve 224', the shaft 225, the other collar 224, and both of the suction cup carrying arms 222. As a result, the cups swing up into contact with the lowermost blanks of the stack, suction is applied, the cups swing down, a blank moves with them and snaps past the supporting abutments on the stack frame, and the suction is cut off when the blank is positioned to be engaged by the slide 221 and abutment 220.

The slide 221 and the abutment 220 carried thereby are reciprocated by a pair of collapsible toggle levers 230, 231, pivoted together at 233 and connected respectively to a block 234 associated with the slide and a sleeve 235, loose on the shaft 235. The sleeve 235 has a downwardly projecting, short arm 236 pivotally connected to the upper end of a primary lever 237, pivoted to the frame at 238. At an intermediate point 239, relatively close to the fulcrum 238, this lever 237 is attached to a connecting rod 240 associated with a strap 241 surrounding an eccentric cam 242 fast on the shaft 216.

It will be apparent from the link and leverage mechanism disclosed, that the relatively short throw of the eccentric 242 is greatly multiplied, to reciprocate the slide and abutment 220 from the position of Figure 16 to the position of Figure 17, so that the blanks which are pulled downwardly during the downward movement of the suction cups 219, will be fed laterally all the way into the machine, into operative position with respect to the blank advancing means associated with the mandrel. The cut away portion 90b of the bracket 90' accommodates the slide 221 at the inner end of its stroke. Since all of the blank feeding movements are derived from the cam shaft 216, driven from the main cam shaft of the machine, the blank feed will be coordinated with the movements of the other elements in the machine.

*Timing cycle and operation*

The operation of the machine will be described briefly by reference to Figure 19, which is a timing diagram showing the relationship between the several instrumentalities of the machine. The diagram represents one complete rotation of the main cam shafts 30 and 37. The line 250 represents the roll feed cycle. Thus, during one-half of a rotation of the cam shaft 37 from the zero degree point to the 180° point, the rolls 62, 63 feed the end of a strip of sheet material into the machine, under the shear blade 103 and under the mandrel 15. From the 180° point to the 360° point in the rotation of the shaft 37, the arcuate rack 72 is being returned to its initial position and the one-way clutch 76 leaves the feed rolls idle.

The line 251 represents the shear action and the actual cutting stroke is represented between the points 252 and 253. It will be noted that the cutting action occurs almost immediately after the end of the strip has been fed into the machine.

The line 254 represents the movement of the feed slide 114 which carries the blank advancing abutments 124 and the body stripping fingers 126. This slide is idle from the 50° point in the rotation of the cam shaft to the 280° point, during which time, the major portion of the strip feeding operation and the shearing operation have been accomplished. The slide operates very rapidly, from the 280° point to the 325° point, whereupon it is quickly returned from the latter point to the 50° point.

The line 255 represents the operation of the grippers 51, 52 for clamping the blanks firmly against the bottom of the mandrel. The grippers are raised between the 350° point and the 10° point. They remain in clamping relation to the blank during the time of the cycle between the 10° point and the 275° point. From that point to the 295° point, the grippers are being lowered, and they remain in the inoperative position until the 350° point in the cycle is reached.

The line 257 represents the operation of the cam forming wings or jaws 16, 17. The jaws are being moved into closed position from the zero point in the rotation of the cam shaft 37 to the 60° point. They remain closed until the 255° point where they commence their opening movement. At the 315° point, they are completely open, and they remain open until the zero degree point again is reached.

The line 258 represents the horizontal movement of the welding wheel 19. It should be noted that between points 259 and 260, the line 258 is straight, representing a constant speed of travel during the welding stroke of the wheel resulting from the formation of the cam groove 166 on the barrel 31. Horizontal line 261 represents the time when the welding current is turned on and line 262, when it is turned off.

The line 263 represents the vertical movements of the bracket 23 and the electrode supporting carriage 21. The carriage is moved downwardly to bring the wheel 19 into contact with the work, and such contact is made slightly ahead of the point 264, an allowance being made for lost motion between the carriage and wheel during compression of the spring 181. The carriage is raised at point 265, just prior to the return of the welding wheel to its initial position and just after the beginning of the opening movement of the can body folding wings 16, 17.

It will be apparent from a consideration of Figure 19, and the above description, that all of the several parts of the machine are so interconnected and correlated as to produce a novel sequence of operations.

It must be understood that the invention is not limited to the details of construction shown in the accompanying drawings and described above, nor to the particular proportions of parts disclosed. The machine may be made in any desired size, to produce small cans or large kits and drums of a capacity of five gallons or more. Moreover, the shape of the mandrel and the wings may be changed at will to produce can bodies of other than circular cylindrical shape. The invention includes all such modifications as come within the scope of the appended claims or their equivalents.

I claim:

1. A can body welding machine comprising a mandrel adapted to support can bodies with their side seams disposed upwardly, a vertically movable substantially horizontal slideway above and parallel to the mandrel, a carriage mounted for horizontal sliding movement upon said slideway, means for reciprocating the carriage, an electrode wheel supported by the carriage, and automatic means operating in timed relation to the carriage reciprocating means for raising and lowering the slideway, the carriage and the electrode wheel, to move the wheel out of and into contact with a can body on the mandrel at the respective ends of the reciprocating movement of the carriage.

2. A can body welding machine comprising a mandrel adapted to support can bodies with their side seams disposed upwardly, a vertically movable, substantially horizontal slideway above and parallel to the mandrel, a horizontally slidable carriage on said slideway, means for reciprocating the carriage, an electrode wheel supported by the carriage, and means for lowering and raising said slideway, said carriage and the wheel supported thereby, said carriage reciprocating means and said lowering and raising means being actuated by common driving means in predetermined timed relation to each other to bring the wheel into and out of contact with the side seams of can bodies on the mandrel at the ends of the reciprocating movements of the carriage.

3. A can body welding machine comprising a mandrel for supporting can bodies with their side seams disposed upwardly, a vertically movable, substantially horizontal slideway above and parallel to the mandrel, a horizontally slidable carriage on said slideway, an electrode wheel supported by the carriage, means for lowering and raising the slideway, the carriage mounted thereon and said electrode wheel, to move the wheel into and out of contact with the work, and means for sliding the carriage back and forth along said slideway in timed relation to the lowering and raising movements of the slideway, the carriage and the wheel.

4. A can body welding machine comprising a mandrel adapted to support can bodies with their side seams disposed upwardly, a vertically movable substantially horizontal slideway above and parallel to the mandrel, a carriage mounted for reciprocation on the slideway, a lever pivoted to said carriage for limited downward swinging movement with respect thereto, an electrode wheel journalled at the free end of the lever, and means operative after a reciprocation of the carriage for raising the slideway and the carriage a greater distance than said limited movement of the lever, to raise the wheel out of contact with the work on the mandrel.

5. A can body welding machine comprising a mandrel adapted to support can bodies with their side seams disposed upwardly, a vertically movable, substantially horizontal slideway above and parallel to the mandrel, a carriage mounted for horizontal reciprocation on the slideway, a lever pivoted to said carriage for movement in a vertical plane, an electrode wheel journalled at the free end of the lever, a stop for limiting the relative downward movement of the lever, and means for raising the slideway and the carriage a distance sufficient to render the stop operative to prevent further downward movement of the lever, thereby to raise the lever and wheel out of contact with a can body on the mandrel.

6. A can body welding machine comprising a mandrel adapted to support can bodies with their side seams disposed upwardly, a vertically movable, substantially horizontal slideway above and parallel to the mandrel, a carriage mounted for reciprocation along the slideway, a lever pivoted to said carriage for limited downward movement with respect thereto, an electrode wheel journalled at the free end of the lever, a spring urging the lever and wheel downwardly to their limit of movement, means for lowering the slideway and the carriage to bring the wheel into contact with a can body on the mandrel and for pressing the same downwardly against the pressure of said spring, and means operative after a reciprocation of the carriage for raising the slideway, the carriage and the lever to lift the wheel out of contact with the can body.

7. A can body welding machine comprising a horizontal can body supporting mandrel, a vertical slideway above the mandrel, a bracket slidably mounted for vertical movement in said slideway, said bracket having a horizontally projecting portion above the mandrel, an electrode wheel supported by said portion and movable therealong for welding cooperation with the mandrel, and means for vertically reciprocating said bracket and for horizontally reciprocating the wheel in predetermined timed relation to each other.

8. A can body welding machine including a horizontally disposed mandrel, a vertical slideway above the mandrel, a bracket slidably mounted for vertical movement in said slideway, said bracket having a horizontally projecting track portion above the mandrel, a reciprocating carriage slidable on said track, an electrode wheel carried by the carriage, means for reciprocating said carriage and the wheel carried thereby, and means for raising and lowering the bracket and the carriage vertically in timed relation to the reciprocating movements of the carriage.

9. A can body welding machine comprising a horizontal mandrel, a vertical guide above the mandrel, a bracket in the form of a right triangle having its vertical leg in said guide and its horizontal leg disposed above and parallel to the mandrel, a carriage slidably mounted on said horizontal leg, an electrode wheel carried by the carriage, means for reciprocating the carriage along said leg to cause the wheel to traverse the mandrel, and means, operating in timed relation to the carriage reciprocating means, for raising and lowering said bracket to move the wheel out of and into contact with a can body on the mandrel.

10. A can body welding machine comprising a horizontal mandrel, a vertical guide above the mandrel, a bracket in the form of a right triangle having its vertical leg in said guide and its horizontal leg disposed above and parallel to the mandrel, a carriage slidably mounted on said horizontal leg, an electrode wheel carried by the carriage, a constantly rotating cam shaft, lever means operated thereby and connected to said bracket for raising and lowering the same to move the wheel out of and into contact with a can body on the mandrel, and driving means operating in synchronism with the rotations of said cam shaft for reciprocating the carriage and the wheel longitudinally of the mandrel in timed relation to the movements of the bracket.

11. A can body welding machine comprising a horizontal mandrel, a vertical guide above the mandrel, a bracket in the guide having a horizontally projecting portion spaced above the mandrel and parallel thereto, a carriage supporting a welding wheel and mounted for reciprocation on said horizontally projecting portion, a lever operatively connected to said bracket, a link and crank connected to said carriage, and cam means for actuating said lever and said crank and link in predetermined timed relation, to raise and lower the bracket and to reciprocate the carriage and wheel along the mandrel.

12. A can body welding machine comprising a horizontal mandrel, a bracket mounted for limited vertical movement and having a horizontally projecting portion parallel to and spaced above the mandrel, a carriage supported for reciprocation on said portion, a welding wheel carried by the carriage, a single cam shaft having a plurality of cam surfaces associated therewith, and independent connections, one leading from one of said surfaces to said bracket and the other from another of said surfaces to said carriage, said cam surfaces and said connections serving to raise and lower the bracket and reciprocate the carriage horizontally in predetermined timed relation.

13. A can body welding machine comprising a horizontal mandrel, a vertically movable bracket having a horizontally projecting portion parallel to and spaced above the mandrel, a carriage supported for reciprocation on said portion, a welding wheel carried by the carriage, a vertical cam shaft, a cam barrel thereon having two cam grooves, a horizontally disposed lever having a follower in one of said grooves, a link connection to the bracket to impart vertical movements thereto, a rock shaft having one arm engaging the other of said grooves and the other arm linked to said carriage to impart horizontal reciprocations thereto, in timed relation to the vertical movements of the bracket.

14. A can body welding machine comprising a horizontal mandrel, a bracket mounted for limited vertical movement and having a horizontal track portion above and parallel to the mandrel, a carriage movable along said track, a welding wheel supported from and beneath the carriage, means for imparting vertical reciprocations to the bracket and horizontal reciprocations to the carriage, said means comprising a pair of constantly rotating cams and connections between the cams and the bracket and carriage, and cam operated means for controlling the flow of current to said welding wheel in predetermined timed relation to the movements of the bracket and the carriage.

15. A can body welding machine comprising a horizontal mandrel, a bracket mounted for limited vertical movement and having a horizontal track portion above and parallel to the mandrel, a carriage movable along said track, a welding wheel supported from and beneath the carriage, means for imparting vertical reciprocations to the bracket and horizontal reciprocations to the carriage and wheel in predetermined timed relation, said means comprising a single cam shaft, a pair of cam surfaces on said shaft and independent connections from said surfaces, respectively, to the bracket and the carriage, and means for controlling the flow of electric current to the welding wheel, said means comprising a third cam carried by said cam shaft and a circuit controller actuated by the last mentioned cam.

JAMES H. GRAHAM.
GEORGE W. JACKMAN.
JESSE B. BURTON.
ZENAS P. CANDEE.